United States Patent [19]

Lochel, Jr.

[11] 4,108,817

[45] Aug. 22, 1978

[54] AUTODEPOSITED COATINGS

[75] Inventor: Frank P. Lochel, Jr., Lansdale, Pa.

[73] Assignee: Amchem Products, Inc., Ambler, Pa.

[21] Appl. No.: 755,921

[22] Filed: Dec. 30, 1976

[51] Int. Cl.$^2$ ............................................. C23F 7/00
[52] U.S. Cl. ................................. 260/29.6 E; 148/6.2; 204/181 R; 260/29.6 N; 260/29.6 M; 260/29.6 Z; 260/29.6 MP; 260/29.6 R; 260/27 R; 260/29.7 E; 260/29.7 M; 260/29.7 P; 260/29.7 R
[58] Field of Search ...................... 148/6.2; 204/181 R; 260/29.6 E, 29.6 N, 27 R, 29.6 M, 29.6 Z, 29.6 MP, 29.7 N, 29.7 E, 29.7 P, 29.7 M, 29.6 R, 29.7 R

[56] References Cited

U.S. PATENT DOCUMENTS

| 3,585,084 | 6/1971 | Steinbrecher et al. | 148/6.2 |
|---|---|---|---|
| 3,592,699 | 7/1971 | Steinbrecher et al. | 148/6.2 |
| 3,791,431 | 2/1974 | Steinbrecher et al. | 148/6.2 |
| 3,839,097 | 10/1974 | Hall et al. | 148/6.2 |
| 3,936,546 | 2/1976 | Hall | 427/375 |

FOREIGN PATENT DOCUMENTS 721,146  9/1972  South Africa.

OTHER PUBLICATIONS

Kirk–Othmer, vol. 6, pp. 317–330.

Primary Examiner—Eugene C. Rzucidlo
Attorney, Agent, or Firm—Alexis Barron

[57] ABSTRACT

In an acidic aqueous coating composition containing dispersed particles of an organic coating-forming material and of the type which forms on a metallic surface immersed therein an organic coating which increases in thickness the longer the surface is immersed in the composition, the improvement comprising including in said composition an acid inhibitor thereby improving the quality of said coating, including reducing or preventing the tendency of said composition to form coatings which contain pinholes or blisters.

15 Claims, No Drawings

AUTODEPOSITED COATINGS

FIELD OF THE INVENTION

This invention relates to the formation of organic coatings on metallic surfaces. More specifically, this invention relates to the deposition on metallic surfaces of organic coatings by contacting the metallic surfaces with an acidic aqueous coating solution containing dispersed particles of an organic coating-forming material such as resin particles.

A relatively recent development in the coating field is the provision of water-based coating compositions which are effective, without the aid of electricity, in forming on metallic surfaces immersed therein organic coatings that increase in thickness or weight the longer the time the surfaces are immersed in the compositions. (For convenience, a coating composition of this type is hereafter referred to as an "autodepositing composition" and a coating formed from such a composition is hereafter referred to as an "autodeposited coating".) Speaking generally, compositions which are so effective comprise acidic aqueous coating solutions having dispersed therein particles of an organic material such as resin particles. Autodeposited coatings are formed from such compositions as a result of their ability to attack and dissolve from the metallic surface metal ions in amounts which cause the particles to deposit on the surface in a manner such that there is a continuous buildup of organic coating on the surface.

Coatings formed from such compositions are distinctly different from coatings formed by immersing the metallic surfaces in conventional latices, that is, composition comprising solid resin particles dispersed in water. The weight or thickness of a coating formed by immersing a metallic surface in a conventional latex is not influenced by the time the surface is immersed in the latex. It is in the main influenced by the amount of resin solids dispersed in the aqueous medium.

Coatings formed from autodepositing compositions are also distinctly different from coatings formed from earlier known acidic aqueous coating solutions containing dispersed solid resin particles and relatively high amounts of water soluble corrosion inhibitors, such as compounds containing hexavalent chromium. The use of relatively high amounts of corrosion inhibitors in such solutions deters attack of the metallic surface to an extent such that resinous coatings which grow with time are not obtained. Thus, resinous coatings formed by immersing metallic surfaces in such compositions are like those formed from immersing the metallic surfaces in conventional latices in that they do not grow with time.

The use of autodepositing compositions offers a number of advantages. For example, autodepositing compositions containing relatively small amounts of coating-forming solids can be used to apply relatively thick organic coatings to metallic surfaces in a relatively short period of time and in a one-step operation. Also, the coating thickness can be controlled by varying the immersion time of the metallic surface in the autodepositing composition. In addition, edges of the metallic substrate can be coated readily. In general, coatings which have good corrosion resistant properties and aesthetic appearance are obtainable. And such coatings can be formed without using electricity, as is required in electrocoating. These are but a few of the advantages which flow from the use of antodeposition, that is, the coating process which involves the formtion of antodeposited coatings without the use of electricity.

Although autodepositing compositions are capable of forming organic coatings of excellent quality, it has been observed that under certain conditions, coatings having defects are formed. Examples of such defects are pinholes, blisters, and/or craters.

For use in some applications, such defects may be of little or no consequence. However, there are applications where coatings containing such defects would not be tolerable or at least, undesirable. Such defects generally lower the corrosion resistant properties of the coatings. In applications where such properties are important, such coatings would be unsuitable. They would be unsuitable also in applications in which it is desired that the coating appearance comprises a smooth unbroken film.

The present invention relates to reducing or preventing the formation of defects in coatings formed from an autodepositing composition.

SUMMARY OF THE INVENTION

In accordance with this invention, an additive is included in an autodepositing composition for the purpose of reducing or preventing the tendency of said composition to form coatings which have defects such as, for example, pinholes, blisters, and/or craters. The present invention can be used also to prevent or deter a coating defect known as bridging, as will be explained in detail below.

The additive for use in the composition of this invention is referred to herein as a "corrosion inhibitor" or "acid inhibitor" or simply "inhibitor" and can be selected from a wide variety of compounds including, for example, aldehydes, ketones, amines, thiols, mercaptans, sulfides, thioureas, silicates, phosphates, carbonates, nitrites, oximes, alkynols, chromates and dichromates. Mixtures of inhibitors can be used also.

The inhibitor is effective in the composition when used in very small amounts, for example, in hundredths or tenths of a percent.

The preferred acidic aqueous coating composition in which the corrosion inhibitor is included is one containing dispersed resin particles, most preferably resin particles of styrene-butadiene, and prepared from hydrofluoric acid and a ferric-containing compound, most preferably ferric fluoride.

DETAILED DESCRIPTION OF THE INVENTION

There are autodepositing applications in which defect-free coatings are produced. However, under certain conditions, antodeposited coatings having defects are formed.

One of the factors involved in the formation of coatings having defects is the type of metal surface being treated. Coating defects have been encountered when coating metal surfaces which have been worked, for example, subjected to forming, stamping, bending, drawing, shearing or similar operations. Working of the metal surface generally imparts strains or stresses to the metal and can result in scratching, scoring or galling of the surface. The more highly worked the surface, the greater the tendency for coatings formed thereon to contain defects. In general, the defects are confined to those portions of the coating that overlie the portions of the metal surface that have been worked. For example, in an application in which but a portion of the metal surface has been galled as a result of a stamping operation, defects have been observed in only those portions of the coating that overlie the gall marks; otherwise, the coating is defect-free.

Defects in autodeposited coatings have also been encountered when coating metal surfaces that are in a roughened condition for reasons other than their having been worked. Articles made by a casting operation often have roughened surfaces as a result of the rough surfaces of the walls of the mold in which the article is formed.

Defects in autodeposited coatings formed on metal surfaces of the type described above can take various forms, depending on the particular application involved. For example, the defects may show up as pinholes, blisters and/or craters in the coating. (The term "crater", as used herein, refers to a defect that looks like a collapsed blister.) In some applications, defects are not observable in the wet unfused coating, but they appear after the coating has been fused by subjecting it to an elevated temperature. In other applications, the wet coating may contain blisters which are converted to pinholes during fusion of the coating at elevated temperatures, or the blisters may remain in the coating after fusion. Still in other applications, pinholes have been observed in the wet, unfused coating.

Process steps used in an autodepositing operation often include subjecting the wet autodeposited coating to rinse steps after the metal article has been contacted with the autodepositing composition. For example, a wet or partially dried coating can be subjected to a water rinse and/or contact with an aqueous chromium-containing solution for the purpose of improving the corrosion resistant properties of the coating. In some applications, the problem is so severe that those portions of the coating overlying the portions of the surface that lead to the aforementioned type defects slough upon contact with the liquid composition, that is, pieces of the coating are removed during the rinse treatment. In such cases, the defect appears as an uncoated portion of the metal surface.

Bridging is another type of defect which can be encountered when coating certain types of metal articles. Bridging occurs in autodeposited coatings formed on articles having surfaces which do not lie in the same plane, but which intersect, and appears at the line of intersection. Bridging is evidenced by the pulling away of the coating from the underlying metallic surface at the aforementioned line of intersection.

There are a number of additional factors which play a role in whether or not defects in autodeposited coatings are encountered, and if they are encountered, the extent or degree of their severity. There are applications in which defects are encountered utilizing a particular type of autodepositing composition, but they are not encountered when utilizing a different type of autodepositing composition. The temperature of the autodepositing composition can also play a role in that, in general, the higher the temperature of the composition, the greater the tendency for defects to be formed. The thickness of the coating can also have an effect in that the greater the thickness, the less likelihood of defect formation. Coating thickness in turn can depend on various factors, such as, for example, the time of contact of the metal surface with the autodepositing composition, the coating-forming solids content of the autodepositing composition, and the temperature of the autodepositing composition.

In any particular application which involves coating of metal surfaces of the type described above, and in which coating defects of the type referred to above are encountered, the present invention can be used to deter or prevent the formation of such defects.

Coating compositions which are effective in forming autodeposited coatings are known. Examples of such coating compositions are described in U.S. Pat. Nos. 3,585,084, 3,592,699, 3,709,743 and 3,776,848, in British Patent No. 1,241,991, in South African Pat. No. 72/1146 and in Belgian Pat. of Addition No. 811,841.

Speaking generally, the acidic aqueous coating compositions of the aforementioned type function to attack and dissolve from a metallic surface contacted therewith metal ions in an amount sufficient to directly or indirectly cause organic particles in the region of the metallic surface to deposit thereon in a continuous fashion, that is, in a manner such that there is a buildup in the amount of organic material deposited on the surface the longer the time the surface is in contact with the composition. This deposition of the organic material on the metallic surface is achieved through chemical action of the coating composition on the metallic surface. The use of electricity which is necessary for the operation of some coating methods, such as the electrocoating method, is not required.

It is believed that the present invention will be used most widely in connection with coatings formed from autodepositing compositions that contain solid particles of resin dispersed in an aqueous solution containing dissolved fluoride and ferric iron. (For example, see South African Pat. No. 72/1146.) Preferably, the aqueous phase of the coating composition contains surfactant in an amount below the critical micelle concentration (hereafter referred to as "CMC"), and most preferably, the concentration of surfactant in the aqueous phase of the composition is below the surfactant concentration which corresponds to the inflection point on a graph of surface tension versus the logarithm of surfactant concentration in the composition. Preferably, the composition includes an anionic surfactant and the source of the resin dispersion of the composition is a latex containing surfactant in an amount such that the aqueous phase of an autodepositing composition formulated from the latex has a surfactant concentration below the CMC, preferably below the aforementioned inflection point surfactant concentration.

A preferred composition for use in the practice of the present invention is described in U.S. patent application Ser. No. 664,613, filed Mar. 8, 1976, in the name of Wilbur S. Hall, and assigned to the same assignee as the present invention, and incorporated by reference. The preferred composition has a surfactant concentration as described above and a pH of about 1.6 to about 4 and is prepared from water, a ferric-containing compound, most preferably ferric fluoride, in an amount such that it contains the equivalent of about 0.5 to about 3.5 g/l of ferric iron, about 0.2 to about 5 g/l of HF, optionally a pigment such as carbon black, and about 50 to about 125 g/l of resin particles which are all of substantially the same size and substantially chemically homogeneous, that is, each particle is comprised of the same monomeric constituents present in substantially the same proportions of resin particles which are prepared by copolymerizing the following monomers:

1. about 25 to about 70, and preferably about 40 to about 65 wt. % of a conjugated diene having, for example, 4 to about 9 carbon atoms, such as butadiene or isoprene;

2. about 5 to about 70, and preferably about 30 to about 65 wt. % of $CH_2=CHR$, wherein R is an aryl or a cyano group, for example, styrene or acrylonitrile;

3. about 1 to about 50, and preferably about 3 to about 15 wt. % of a vinyl halide such as vinyl chloride or vinylidene chloride; and 4. about 0.5 to about 15, and preferably about 1 to about 4 wt. % of a monoethylenically unsaturated monomer having a functional group selected from the class consisting of amide and carboxylic groups, such as acrylamide, methacrylamide, octyl acid maleate and monoethylenically unsaturated monocarboxylic and dicarboxylic acids having about 3 to about 12 carbon atoms, and preferably about 3 to about 5 carbon atoms, such as, for example: acrylic acid; cinnamic acid; methacrylic acid; crotonic acid; itaconic acid; maleic acid; and fumaric acid.

The resin is used most conveniently in the form of a latex which can be prepared according to available techniques.

A particularly preferred latex contains particles of resin prepared from the aforementioned monomers, which particles are chemically and physically homogeneous. The resin particles of the preferred latex are prepared from styrene, butadiene, vinylidene chloride and methacrylic acid. In addition, the emulsifier or surfactant content of the preferred latex is about 1 to about 4% based on the resin solids and comprises at least 90 wt. %, most preferably 100 wt. % of an anionic emulsifier such as a sulfonate, for example, sodium dodecylbenzene sulfonate, or a sulfosuccinate, for example, sodium oleoyl isopropanolamide sulfosuccinate, or a mixture thereof.

A highly preferred autodepositing composition has a surfactant concentration as described above and a pH within the range of about 2 to about 3.2 and comprises about 50 to about 125 g/l of resin solids, ferric fluoride, in an amount equivalent to about 0.5 to about 2 g/l of ferric iron, and about 0.7 to about 3 g/l of HF.

The additive or mixture of additives included in the autodepositing composition for the purpose of improving the coating properties thereof is a corrosion inhibitor, a known class of materials which are used to deter attack or corrosion of metallic surfaces which are exposed to a corrosive environment such as an acid solution. Corrosion inhibitors, also known as "acid inhibitors", are used widely in acid pickling solutions to deter removal of the base metal from which oxide scale or other unwanted deposits are removed by acid attack thereof. They are used widely also in acidic compositions which are pumped through metal tubing in the acidizing of oil wells. And they are used also to a great extent in preventing boiler corrosion.

The number of corrosion inhibitors reported in the literature is legion. As will be seen from the example section below, all of the various different inhibitors disclosed therein are effective in reducing the tendency of the formation of defects in coatings formed from the coating composition.

Accordingly, any inhibitor which is capable of reducing acid attack of the metallic surface contacted with the coating composition can be used in the practice of the present invention. The inhibitor should be soluble in the composition. By way of example and generally speaking, corrosion inhibitors which can be used in the compositions are aldehydes, ketones, amines, thiols, mercaptans, sulfides, thioureas, silicates, phosphates, carbonates, nitrites, oximes, chromates, dichromates and alkynols.

Among the corrosion inhibitors that can be used are amine compounds which are the product of a Mannich reaction which involves the reaction of a nitrogen compound having at least one active hydrogen attached to a nitrogen atom with an alpha-ketone and formaldehyde in the presence of an acid. The use of rosin amines in a Mannich reaction, as described in U.S. Pat. No. 2,758,970, is exemplary, although other types of primary or secondary amines can be used.

A preferred inhibitor for use in the present invention is propargyl alcohol. Particularly good results have been attained also by using an inhibitor composition prepared from thiourea and the product of a Mannich reaction involving the following reactants: amines derived from pine resin acids (predominately dehydroabietylamine), acetophenone, acetone and formaldehyde and reacted in the presence of hydroxyacetic acid. The composition contains about 0.004 to about 1100 parts by weight, preferably about 0.09 to about 150 parts by weight of the product of the Mannich reaction for each part of thiourea. In general, such as acid inhibitor composition will also contain surfactants which help to stabilize and disperse the Mannich reaction product in the acidic composition and alcohols which are generally added as solubilizers to the aqueous concentrate of the inhibitor composition. Such an inhibitor composition is known to be particularly effective when used in HF cleaning solution and is a preferred inhibitor for use in a coating composition of the present invention which includes HF.

The amount of inhibitor included in the composition should be an amount which is at least effective to reduce the tendency of the composition to form coatings which have defects. The maximum amount of inhibitor included in the composition is dictated by the amount of inhibitor which substantially deters or prevents the composition from forming an autodepositing coating or an autodeposited coating having the desired thickness. In this connection, it is noted that the formation of autodeposited coatings depends on the ability of the composition to dissolve metal from the metallic substrate contacted therewith in an amount sufficient to cause formation of an organic coating which grows with time. As will be seen from certain of the examples reported below, the use in the composition of an inhibitor in relatively high amounts tends to decrease the thickness of the coating formed.

As to the cause of coating defects in autodeposited coatings, it is believed that those portions of a metal surface which have been worked are more sensitive to the coating composition than portions which have not been worked. In other words, it is believed that the worked portions of the surface are more highly reactive and are more readily attacked by the coating composition with the result that, at these portions, hydrogen ion is reduced to hydrogen in amounts greater than that generated at other less reactive portions of the surface. It is believed that excessive amounts of hydrogen are also produced when coating roughened surfaces of the type mentioned above and also when coating surfaces of the type that lead to bridging defects.

In severe applications involving the coating of worked or roughened surfaces where relatively high amounts of hydrogen are generated, defects such as pinholes are evident in the wet or uncured coating. In less severe applications, it appears that the hydrogen remains entrapped beneath or within the coating until the coating is cured or fused at elevated temperature at which time the hydrogen expands. Depending on various factors, the hydrogen may cause pinholes, blisters or craters to be formed in the coating.

It is believed that the use of an inhibitor according to the present invention deactivates the relatively reactive portions of the surface, thus deterring or preventing the generation of excessive hydrogen, which in turn leads to the formation of improved quality coatings. It is believed also that the use of the inhibitor in the composition helps to prevent or reduce any tendency of hydrogen embrittlement of the metallic surface by the coating composition.

There are many factors which govern the specific amount of inhibitor to include in the composition. As mentioned above, the number of inhibitors is legion. Work has shown that the effective amounts of inhibitors can tend to vary depending on the specific inhibitor used. In addition, the effective amount of inhibitor will tend to vary depending on the activity of the specific coating composition used, that is, the extent to which the composition attacks and dissolves metal from the metallic surface. Also, the effective amount of inhibitor will tend to depend on how reactive the worked or roughened portions of the metal surface are and on the relative reactivity of the metal itself. The more highly worked or roughened the surface, the more reactive it generally is to the composition, and the more inhibitor needed to prevent the formation of defects in the coating. Similarly, some metals are more reactive toward the composition than others.

As mentioned above, another of the factors involved in the development of coating defects is the temperature at which the autodepositing composition is contacted with the metal surface. In this connection, it is noted that autodepositing compositions are effective in forming coatings on metal surfaces over a wide temperature range, including temperatures approaching the boiling point of the composition and temperatures approaching those at which the dispersed organic coating-forming particles are undesirably coagulated. There are advantages in operating at elevated temperatures. Speaking generally, the higher the temperature of the composition, the greater the rate of coating formation. Thus, at higher temperatures the shorter the time required to produce coatings of a given thickness. On the other hand, the use of higher temperatures usually leads to a more aggravated condition of coating defects when coating metal surfaces of the type that are prone to this problem. One of the advantages of the present invention is that the coating composition can be used effectively at a temperature that might otherwise be avoided because the use of such temperature, in the absence of the inhibitor, would normally lead to the formation of coating defects.

In view of the numerous factors which can play a role in the development of the problem and/or the severity thereof, it is suggested that experience be used in a specific application to determine the effective amount of inhibitor to use. By way of guideline, it is noted that improved results have been achieved in certain applications by including in the composition about 25 ppm of the inhibitor. In general, it is recommended that the amount of inhibitor included in the composition be in the range of about 100 to about 5000 ppm and adjustments be made as needed for the specific application. It is noted that experience in a specific application may show that amounts of inhibitor outside the aforementioned range are effective. Indeed, and as will be seen from examples reported below, as much as 10,000 ppm of inhibitor have been used. The inhibitor can be added directly to the coating composition.

When utilizing the preferred inhibitor composition prepared by the Mannich reaction described above, it is recommended that it be used in a concentration of about 100 to about 3000 ppm. When utilizing propargyl alcohol, it is recommended that it be used in a preferred concentration of about 100 to about 500 ppm.

In addition to the ferriferous surfaces shown in the examples below, the invention has applicability also to the treatment of surfaces comprising other metals, for example, aluminum and zinc surfaces.

Although the coating composition can be contacted with the metal surface in a variety of ways, including, for example, by spraying and flow coating, it is believed that the most widely used method of contact will comprise immersing the metal surface in the coating composition at about room temperature. As mentioned above, the longer the metal surface is immersed in the coating composition, the greater the buildup in coating thickness. It is believed that for most applications, desired coating thicknesses can be obtained by immersing the metal surface in the composition for a period of time within the range of about 30 seconds to about 3 minutes. However, it should be understood that longer or shorter periods of time can be used.

Agitating the composition aids in maintaining it uniform. Also, agitation of the composition is effective in improving the uniformity of the coatings formed.

Various factors should be taken into account in determining whether the metal surface should or should not be cleaned, and the extent of cleaning, prior to contact with the autodepositing composition, including, for example, the nature of foreign materials (if any) on the surface and the desired quality of the coating. Foreign materials which are present on the metal surface can lead to the formation of coatings which are not uniform. Also, the adhesion and corrosion resistant properties of the resinous coatings can be affected adversely as a result of the pesence on the metal surface of foreign materials during the coating step. Generally speaking, improved quality coatings can be consistently obtained the cleaner the surface. Excellent results can be achieved consistently by subjecting the metal surface to a cleaning operation which results in a surface on which there can be formed a water break-free film. The selection of the cleaning agent and mode of application thereof to the metal surface will depend on the type of foreign materials present on the metal surface. Available cleaning agents can be used in accordance with known technology. Thus, depending on the type of soil or foreign materials which are present, acidic, alkaline or other cleaning agents can be used. By way of example, dilute phosphoric acid can be used to clean lightly rusted parts and hot alkaline compositions can be used for the removal of oils, greases, fingerprints and other organic deposits.

After contact with the autodepositing composition, the coated metal surface can be subjected to further processing steps as are known. Such steps are described briefly hereafter.

Water rinsing the coated surface after it has been withdrawn from the composition, and before significant drying takes place is effective in removing therefrom residuals such as acid and other ingredients of the bath that adhere to the coated surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing with tap or deionized water. If they do not, this step of removing them can be eliminated.

If desired, the corrosion resistant properties of the coated surface can be improved by contacting the coated surface with an acidic aqueous rinse solution containing hexavalent chromium. Such rinse solutions can be prepared from chromium trioxide or a water soluble dichromate or chromate salt, for example, ammonium, sodium and potassium salts. There can also be used a chromium composition obtained by treating a concentrated aqueous solution of chromic acid with formaldehyde to reduce a portion of the hexavalent chromium. This type of rinse composition, which is described in U.S. Pat. No. 3,063,877 to Schiffman, contains chromium in its hexavalent state and reduced chromium in aqueous solution. It has been reported also that the water and salt spray resistance of a fused resinous coating can be improved by contacting the unfused coating with a solution, preferably an aqueous solution, of phosphoric acid (see U.S. Pat. No. 3,647,567). The recommended amount of phosphoric acid in the solution is about 0.25 to about 7 wt.% based on the total weight of the solution.

Following any rinse steps employed after the coated surface is withdrawn from the composition, the coating should be dried. Fusion of the resinous coating renders it continuous, thereby improving its resistance to corrosion and adherence to the underlying metal surface.

The conditions under which the drying and/or fusion operation is carried out depend somewhat upon the type of resin employed. In general, heat will be required to fuse the resin. The corrosion resistant properties of coatings fused at elevated temperature have been observed to be better than coatings which have been air dried. However, there are applications where air dried coatings can be used satisfactorily. The fusion of the coating should be carried out below temperatures which cause the resinous coating to degrade. Exemplary conditions used in fusing coatings produced according to the present invention are temperatures within the range of about 100° to about 200° C for periods of time within the range of about 10 to about 30 minutes, depending on the mass of the coated part. Baking the coating for a period of time until the metal surface has reached the temperature of the heated environment has been used effectively.

EXAMPLES

Examples below ae illustrative of the practice of the present invention.

The basic coating compositions used in all of the examples were prepared by combining

| Ingredients | Amounts |
| --- | --- |
| latex containing about 54% solids | 190 g |
| ferric fluoride | 3 g |

| -continued | |
| --- | --- |
| Ingredients | Amounts |
| hydrofluoric acid | 2.3 g |
| black pigment dispersion | 5 g |
| water | to make 1 liter. |

The resin of the latex used in the above composition comprised about 62% styrene, about 30% butadiene, about 5% vinylidene chloride and about 3% methacrylic acid. A film formed from the resin is soluble in refluxing chlorobenzene to the extent of about 13%. That the resin is crosslinked is indicated by its insolubility in Soxhlet extraction with chlorobenzene. The water soluble content of the latex is about 2% based on the weight of dried resin, with the water soluble content comprising about 10% sodium phosphate, about 13% sodium oleoyl isopropanolamide sulfosuccinate and about 75% sodium dodecylbenzene sulfonate, the first mentioned ingredient being a buffering agent used in preparing the latex, and the last 2 mentioned ingredients being emulsifiers. The pH of the latex was about 7.8 and the surface tension thereof about 45-50 dynes/cm. The average particle size of the resin was about 2,000 A.

The black pigment dispersion used in the above composition is an aqueous dispersion having a total solids content of about 36%. Carbon black comprises about 30% of the dispersion. It has a pH of about 10-11.5 and a specific gravity of about 1.17. The dispersion contains a nonionic dispersing agent for the solids, and is sold under the trademark Aquablak 115. The inhibitors of the examples were added to the coating compositions, as above described.

Three of the many inhibitors used in the examples were compositions which included materials prepared by a Mannich reaction. The preparation of these 3 compositions is described below. The compositions are identified as Inhibitor A, Inhibitor A' and Inhibitor A".

Inhibitor A

This inhibitor is prepared by reacting, in the presence of HCl, acetophenone, acetone, formaldehyde, and a composition comprising stabilized abietylamines, predominately dehydroabietylamine of the formula

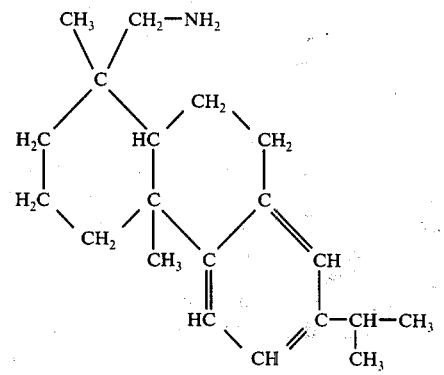

The aforementioned composition is a clear yellow viscous liquid sold under the tradename "Amine 750" by Hercules Incorporated. The composition is derived from pine resin acids and is produced to contain a minimum amount of secondary amines. Various properties of the composition are as follows.

| | |
|---|---|
| color, Gardner | 6 |
| s.g. at 25/15.6° C | 0.9990 |
| refractive index at 20° C | 1.5447 |
| visc., poises at 25° C | 87 |
| flash point, ° F | 380 |
| neutralization equiv. | 305 |
| secondary amine content, % | 1 |
| total amine content, % | 95 |

A 2-stage Mannich reaction is used in which, in the first stage, 2.3 l parts of the amine composition are reacted with 0.8 part of acetophenone and 1 part of 37 wt. % aqueous solution of formaldehyde in the presence of HCl (20° Bé) at a temperature of about 80° C for about 24 hours. In the second stage of the reaction, 2.5 parts of acetone and 1 part of 37 wt. % aqueous solution of formaldehyde are added to the product of the first reaction stage and the reactants are reacted for 24 hours at a temperature of about 60° C. After completion of the reaction, excess reactants (primarily acetone) are separated from the reaction mixture by distillation. To the reaction product (6.4 parts), there are added 1.4 parts of a surface active agent (nonylphenyl polyethyleneglycol ether sold under the tradename Tergitol NP 35), about 0.1 part of water and about 0.9 part of isopropanol. This product is Inhibitor A.

Inhibitor A'

Inhibitor A' is prepared by admixing the following ingredients in the proportions stated.

| Ingredients | Wt. % |
|---|---|
| Inhibitor A | 48.1 |
| thiourea | 18.8 |
| isopropanol | 5.0 |
| surface active agent, nonylphenoxy poly (ethyleneoxy) ethanol, sold under the trademark Igepal CO-850 | 24.2 |
| HCl (20° Be) | 3.9 |

Inhibitor A"

This inhibitor is the same as Inhibitor A' except that the Inhibitor A portion is prepared in the presence of about 1 part of 70% hydroxyacetic acid instead of 20° Bé HCl and contains 3.9 wt. % of 70% hydroxyacetic acid instead of 20° Bé HCl.

Unless stated otherwise, the metallic surfaces coated in the examples below were unpolished cold rolled steel panels (Q-panels) 3 inches × 4 inches. All metallic surfaces were cleaned with a conventional alkali cleaner and rinsed with water prior to being coated.

In those examples in which the coated surfaces were rinsed with an aqueous chromium rinse solution, the Cr rinse solution comprised 3 wt. % of an aqueous concentrate prepared from 150 g/l of $Na_2Cr_2O_7 \cdot 2H_2O$ and an aqueous mixture of formaldehyde-reduced $CrO_3$ which contained 20 g/l of reduced Cr, 30 g/l of $Cr^{+6}$, and 25 L g/l of 75 wt. % $H_3PO_4$.

As exemplary of the use of the present invention, steel panels were sanded on a belt sander to impart thereto a highly scored surface representative of a metallic surface of the type that would be obtained when the surface was highly worked or formed. The panels were immersed in coating compositions containing Inhibitor A", in the amounts indicated in Table 1 below, for 75 seconds and the coated panels were then air dried for 60 seconds, water rinsed for 30 seconds, immersed in an aqueous chromium rinse solution for 30 seconds, and thereafter baked for 10 minutes at 170° C. The baked coated surfaces were subjected to salt spray tests for 168 hours. In all of those examples in which coated panels were subjected to salt spray tests, the test used was ASTM D-117, with the coating being scribed. At the completion of the salt spray tests, the panels were rated on a numerical scale ranging from 10 to 0, the number "10" representing no failure, that is, the appearance of the coated panel before and after the salt spray test was basically the same, and the number "0" representing a coating failure of 1 inch or more from the scribe. The panels were rated also on the basis of their overall surface appearance, referred to as "field". The results are set forth in Table 1 below.

TABLE 1

| Ex. No. | Inhibitor A" Comp., ppm | Coating Thickness, in mils | Appearance | Salt Spray Rating Scribe | Field |
|---|---|---|---|---|---|
| 1 | — | 1.3 | many pinholes | 7++ | 6 |
| 2 | 100 | 1.2 | a few pinholes visible under magnification (5x) | " | 10 |
| 3 | 500 | 1.15 | no pinholes | " | " |
| 4 | 1000 | 1.1 | " | 7+ | " |
| 5 | 2000 | 1.1 | no pinholes, coating had grainy appearance | 7 | " |

From Table 1, it can be seen that the inhibitor was effective in reducing the formation of pinholes at a concentration of 100 ppm. It can be seen also that as the concentration of the inhibitor was increased, the thicknesses of the coatings fell off to some extent.

In another series of tests, conventional automotive steel tire rims were coated in accordance with this invention. A 30-gallon bath of the coating composition described above was prepared for this purpose. Inhibitor A" was added to the composition in the amounts indicated in Table 2 below. Rims were immersed in the composition for 40 seconds and the coated rims were then air-dried for 60 seconds, immersed in an aqueous chromium rinse solution for 30 seconds, baked for 20 minutes at 220° F and thereafter for 20 minutes at 350° F. The appearances of the baked coatings are set forth in Table 2.

TABLE 2

| Ex. No. | Inhibitor A" Comp., ppm | Appearance of Coating |
|---|---|---|
| 6 | — | many pinholes and blisters |
| 7 | 200 | few pinholes |
| 8 | 300 | very few pinholes |
| 9 | 500 | no pinholes |

The examples reported in Table 3 below show the formation of coatings with no pinholes on smooth panels and the effects that higher concentrations of inhibitors (Inhibitor A") have on the thicknesses of the coatings formed. The panels were immersed in the composition for 60 seconds and the coated panels were then air dried for 60 seconds, water rinsed for 30 seconds, immersed in an aqueous chromium rinse solution for 30 seconds and baked at 170° C for 10 minutes. The baked coatings were then subjected to salt spray tests for 168 hours.

TABLE 3

| Ex. No. | Inhibitor A" Comp., ppm | Coating Thickness, in mils | Coating Appearance | Salt Spray Rating Scribe | Salt Spray Rating Field |
|---|---|---|---|---|---|
| 10 | — | 1.25 | no pinholes | 7 | 10 |
| 11 | 1000 | 1.15 | " | 8 | 10 |
| 12 | 2000 | 1.0 | " | 7+ | 10 |
| 13 | 3000 | 0.75 | " | 8 | 9 |
| 14 | 4000 | 0.3 | no pinholes, transparent coating | 0 | 0 |

The next series of tests show the use of exemplary inhibitors that can be used in the practice of the present invention. The inhibitors and amounts used are set forth in Table 4 below. Sanded panels were immersed in the coating compositions for 60 seconds and the coated panels were then air dried for 60 seconds, water rinsed for 30 seconds, and baked at 170° C for 10 minutes. The appearance of the baked coatings are set forth in Table 4.

TABLE 4

| Ex. No. | Inhibitor Comp. Identity | ppm | Appearance of Coating |
|---|---|---|---|
| 15 | — | — | many pinholes |
| 16 | thiourea | 95 | some craters |
| 17 | formaldehyde | 20 | many craters |
| 18 | diethyl thiourea | 95 | few craters |
| 19 | A | 240 | very few craters |

The examples reported in Table 5 below show the use of a variety of different inhibitors in coating compositions within the scope of the present invention. Unless stated otherwise, the inhibitors were added to the compositions in amounts of 1,000 ppm. Sanded panels were immersed in the compositions and further treated according to the process described in connection with the examples reported in Table 4 above. The coated panels were rated against one coated in a composition that contained no inhibitor, the inhibitor-free composition forming a coating having many pinholes.

TABLE 5

| Ex. No. | Inhibitor Comp. | Appearance of Coating |
|---|---|---|
| 20 | cyclohexanone | improved |
| 21 | butyl sulfide | very slightly improved |
| 22 | thiourea | no pinholes |
| 23 | diethyl thiourea | " |
| 24 | phenyl hydrazine | " |
| 25 | triethyl amine | improved |
| 26 | formaldehyde | slightly improved |
| 27 | m-tolualdehyde | very slightly improved |
| 28 | picoline | improved |
| 29 | di-o-tolylthiourea | improved |
| 30 | glyoxal | slightly improved |
| 31 | urea | very much improved |
| 32 | sodium silicate | no pinholes |
| 33 | sodium dichromate | very much improved |
| 34 | ammonium dichromate | no pinholes |
| 35 | sodium carbonate | improved |
| 36 | disodium phosphate | very much improved |
| 37 | glyoxime | no pinholes |
| 38 | isopropanolamine | no improvement |
| 39 | isopropanolamine* | no pinholes |
| 40 | p-nitrosodimethylaniline | improved |

*concentration - 4000 ppm

It is noted that the inhibitor used in the composition of Example No. 21 was somewhat immiscible in the composition and formed an oily film on the composition; nevertheless, it can be seen that an improvement in the reduction of pinholes was attained by the use of this inhibitor. Combining the inhibitor with a surface active agent would aid in making it more miscible. The inhibitors of Example Nos. 24 and 40 were effective also in reducing the formation of pinholes in the coatings, but they caused some coagulation of the resin particles — not enough to prevent the composition from forming coatings on the sanded panels.

The next series of examples show the use of an inhibitor (Inhibitor A") to reduce the tendency of coating compositions to form coatings which are bridged. The metallic articles coated were 2 inch pieces of ¼ inch diameter threaded steel rod. They were immersed in the coating composition for the periods of time noted in Table 6 below and further treated according to the process described in connection with the examples reported in Table 4 above. The appearance of the baked coatings are set forth in Table 6 below.

TABLE 6

| Ex. No. | Inhibitor Comp., ppm | Coating Time, seconds | Appearance of Coating |
|---|---|---|---|
| 41 | — | 30 | severely bridged |
| 42 | 1000 | 30 | severely bridged |
| 43 | 2000 | 30 | moderately bridged |
| 44 | 3000 | 30 | no bridging |
| 45 | 3000 | 60 | no bridging |

With respect to Table 6, it is noted that the composition which contained no inhibitor (Example No. 41) formed a coating which was pulled away from the surfaces constituting the valleys of the threads. The improvements obtained by the use of effective amounts of inhibitor are evident from Example Nos. 43 to 45.

The next series of examples show also the use of an inhibitor (Inhibitor A") to reduce the tendency of the coating composition to form coatings which are bridged. The metallic surfaces coated were steel hose connections having threaded parts with a thread spacing of 5/64 inch. The hose connections were immersed in the compositions for the periods of times stated in Table 7 below and further treated according to the process described in connection with the examples reported in Table 4 above. Each composition of the examples in Table 7 below was used also to coat a panel in order to approximate the thickness of the coating formed on the hose connection.

TABLE 7

| Ex. No. | Inhibitor Comp., ppm | Coating Time, seconds | Coating Thickness, mils | Appearance of Coating |
|---|---|---|---|---|
| 46 | — | 60 | 1.3 | severely bridged |
| 47 | 500 | 60 | 1.1 | moderately bridged |
| 48 | 1000 | 60 | 1.0 | slightly bridged |
| 49 | 2000 | 60 | 0.85 | very slightly bridged |
| 50 | 2000 | 120 | n.r.* | " |
| 51 | 3000 | 120 | 0.85 | no bridging |

*not recorded

The next group of examples shows the use of various inhibitors in coating compositions and their effect on reducing pinhole formation in coatings when used in the amounts indicated in Table 8. The panels which were coated were first sanded and then coated and further treated according to the process described in connection with the examples reported in Table 4 above.

TABLE 8

| Ex. No. | Inhibitor Comp. Identity | Amount, ppm | Appearance of Coating |
|---|---|---|---|
| 53 | thiourea | 200 | very few pinholes |
| 54 | " | 500 | no pinholes |
| 55 | diethylthiourea | 200 | many pinholes |
| 56 | " | 500 | very few pinholes |

TABLE 8-continued

| Ex. No. | Inhibitor Comp. Identity | Amount, ppm | Appearance of Coating |
|---|---|---|---|
| 57 | sodium silicate | 200 | many pinholes |
| 58 | " | 500 | no pinholes |
| 59 | ammonium dichromate | 200 | many pinholes |
| 60 | " | 500 | " |
| 61 | " | 800 | very few pinholes |
| 62 | " | 2000 | no pinholes |
| 63 | glyoxime | 200 | many pinholes |
| 64 | " | 500 | " |
| 65 | " | 800 | few pinholes |
| 66 | propargyl alcohol | 200 | no pinholes |
| 67 | A" | 200 | " |
| 68 | A' | 200 | " |

The results of additional tests are shown in Table 9 below. The inhibitors used and the amounts thereof are identified in Table 9. Sanded panels were immersed in the coating compositions for 60 seconds and the coated panels were then air dried for 60 seconds, water rinsed for 30 seconds, immersed in an aqueous chromium rinse solution for 30 seconds, and then baked for 10 minutes at 170° C.

TABLE 9

| Ex. No. | Inhibitor Comp. Identity | Amount, ppm | Appearance of Coating |
|---|---|---|---|
| 69 | — | — | severely cratered and pinholed |
| 70 | urea and A" | 458 42 | cratered |
| 71 | urea and A" | 916 84 | excellent |
| 72 | urea and thiourea | 465 35 | excellent |
| 73 | propargyl alcohol | 500 | excellent |
| 74 | aqueous mixture of alkyl pyridines diethylthiourea, H$_2$SO$_4$ and surfactant | 500 | very slightly cratered |

The next two examples illustrate how the addition of certain inhibitors to particular autodepositing compositions influence the rate at which metal is dissolved by the autodepositing compositions.

EXAMPLE NO. 75

A cold rolled steel panel was immersed for 60 seconds in an autodepositing composition of the type described above. By appropriate calculations, it was determined that the autodepositing composition had dissolved metal from the panel at the rate of about 23.4 mg/ft$^2$/min. When a similar panel was treated in the same way with a like autodepositing composition, but containing 500 ppm of Inhibitor A", it was found that the inhibitor-containing autodepositing composition dissolved metal from the panel at the rate of about 15 mg/ft$^2$/min.

EXAMPLE NO. 76

A cold rolled steel panel was immersed for 60 seconds in an autodepositing composition of the type described above. By appropriate calculations, it was determined that the autodepositing composition had dissolved metal from the panel at the rate of about 22.8 mg/ft$^2$/min. When a similar panel was treated in the same way with a like autodepositing composition, but containing 500 ppm of propargyl alcohol, it was found that the inhibitor-containing autodepositing composition dissolved metal from the panel at the rate of about 19.8 mg/ft$^2$/min.

The next group of examples show the use of varying amounts of propargyl alcohol in an autodepositing composition used to coat sections of a scored steel frame. The autodepositing composition used was like the one described above and the sections were immersed in the composition for about 60 seconds. The results are set forth in Table 10 below.

TABLE 10

| Ex. No. | Amount of Propargyl Alcohol, ppm | Appearance of Coating |
|---|---|---|
| 77 | none | a few pinholes and craters, moderately blistered |
| 78 | 50 | a few craters |
| 79 | 100 | no pinholes, blisters or craters |
| 80 | 150 | no pinholes, blisters or craters |

The next group of examples shows the use of varying amounts of propargyl alcohol in an autodepositing composition, as described above, and the affect thereof on thicknesses of coatings formed from the compositions. Cold rolled steel panels were used in this work and they were immersed in the composition for 60 seconds. The results are set forth in Table 11 below.

TABLE 11

| Ex. No. | Amount of Propargyl Alcohol, ppm | Coating Thicknesses, mil |
|---|---|---|
| 81 | 0 | 1.15 |
| 82 | 100 | 1.15 |
| 83 | 200 | 1.15 |
| 84 | 300 | 1.08 |
| 85 | 400 | 1.20 |
| 86 | 500 | 1.15 |
| 87 | 750 | 1.06 |
| 88 | 1,000 | 1.08 |
| 89 | 2,000 | 0.95 |
| 90 | 5,000 | 0.93 |
| 91 | 10,000 | 0.85 |

Long term testing has shown that propargyl alcohol has no adverse affects on autodepositing baths. An aqueous solution of the propargyl alcohol can be added directly to the autodepositing composition or it can be combined with an aqueous concentrate of the activating ingredients (for example, an aqueous concentrate of HF and FeF$_3$) which is used in preparing an autodepositing composition. Long term testing has shown that aqueous concentrated solutions of HF, FeF$_3$ and propargyl alcohol are stable.

In summary, it can be stated that the present invention provides an effective way for improving the quality of autodeposited coatings, as is exemplified in many of the examples reported above.

I claim:

1. In an aqueous acidic autodepositing composition having resin particles dispersed therein which composition forms on a ferriferous metal surface an autodeposited coating as a result of said composition acting on the metal surface to dissolve metal ions in amounts which cause the resin particles to deposit on the metal surface in a manner such that there is a continuous buildup of organic coating which on curing tends to have defects such as pinholes, blisters, craters or bridges, the improvement comprising including in said composition a material soluble in said composition which is effective in reducing the amount of hydrogen formed during formation of the coating thereby reducing or preventing the tendency of said composition to form coatings which have said defects said material being present in an amount effective to reduce or prevent the tendency of said composition to form coatings which have defects such as pinholes, blisters, craters or bridges said amount being less than that amount which substantially deters or prevents said composition from forming an autodeposited coating or an autodeposited coating having the desired thickness.

2. An autodepositing composition containing solid resin particles and of the type which is effective in forming on a metallic surface an autodeposited resinous coating by dissolving metal ions from the metal surface in amounts which cause the resin particles to deposit on the surface in a manner such that there is a continuous buildup of organic coating having combined therewith an acid inhibitor soluble in said composition in an amount effective to reduce or prevent the tendency of said composition to form coatings which have defects such as pinholes, blisters, craters or bridges said amount being less than that amount which substantially deters or prevents said composition from forming an autodeposited coating or an autodeposited coating having the desired thickness.

3. A composition according to claim 2 including an inhibitor which is a mixture of thiourea and the product of a Mannich reaction in which there are reacted, in the presence of hydroxyacetic acid, amines derived from pine resin acids, including mainly dehydroabietylamine, acetophenone, acetone and formaldehyde.

4. A composition according to claim 3 wherein the amount of said inhibitor is within the range of about 100 to about 3000 ppm.

5. A composition according to claim 2 including propargyl alcohol.

6. A composition according to claim 5 wherein the amount of propargyl alcohol is about 100 to about 500 ppm.

7. An autodepositing composition according to claim 2 wherein said composition has a pH within the range of about 2 to about 3.2 and comprises about 50 to about 125 g/l of resin solids, ferric fluoride in an amount equivalent to about 0.5 to about 2 g/l of ferric iron and about 0.7 to about 3 g/l of HF and wherein an anionic surfactant is present in the aqueous phase of said composition in an amount below the critical micelle concentration.

8. A composition according to claim 7 wherein the concentration of surfactant in the aqueous phase is below the surfactant concentration which corresponds to the inflection point on a graph of surface tension versus the logarithm of surfactant concentration in the composition.

9. A composition according to claim 7 including black pigment and wherein said resin solids are styrene/butadiene resin solids.

10. A composition according to claim 2 wherein the amount of said inhibitor included in said composition is within the range of about 100 to about 5000 ppm.

11. A composition according to claim 2 wherein said inhibitor is selected from the group consisting of alehydes, ketones, amines, mercaptans, sulfides, thioureas, silicates, phosphates, carbonates, nitrites, chromates, dichromates, oximes and alkynols and mixtures thereof.

12. A composition according to claim 11 wherein the amount of said inhibitor included in said composition is within the range of about 100 to about 5000 ppm.

13. A composition according to claim 2 having a pH of about 1.6 to about 4 and including:
(A) resin solids selected from the class consisting of resin particles prepared by polymerizing (i) a conjugated diene, (ii) $CH_2=CH-R$ wherein R is an aryl or cyano group, (iii) a vinyl halide, and (iv) a monoethylenically unsaturated monomer having a functional group selected from the class consisting of amide and carboxylic groups; and resin particles which are substantially chemically and physically homogeneous;
(B) a ferric-containing compound which is soluble in the composition in an amount equivalent to about 0.5 to about 3.5 g/l of ferric iron; and
(C) about 0.2 to about 5 g/l of HF 14. A composition according to claim 13 including an anionic surfactant present in the aqueous phase of the composition in an amount below the critical micelle concentration.

15. A compostion according to claim 14 wherein the concentration of surfactant in the aqueous phase is below the surfactant concentration which corresponds to the inflection point on a graph of surface tension versus the logarithm of surfactant concentration in the composition.

* * * * *

UNITED STATES PATENT AND TRADEMARK OFFICE
CERTIFICATE OF CORRECTION

PATENT NO. : 4,108,817
DATED : August 22, 1978
INVENTOR(S) : Frank P. Lochel, Jr.

It is certified that error appears in the above-identified patent and that said Letters Patent are hereby corrected as shown below:

Column 1, line 68, "antodeposition" should read -- auto-deposition --.

Column 2, line 53, "antodeposited" should read -- auto-deposited --.

Column 8, line 47, "pesence" should read -- presence --.

Column 9, line 61, "ae" should read -- are --.

Column 11, line 10, after 2.3, eliminate "1".

*Signed and Sealed this*

*Nineteenth* Day of *June 1979*

[SEAL]

Attest:

RUTH C. MASON
*Attesting Officer*

DONALD W. BANNER
*Commissioner of Patents and Trademarks*